(12) United States Patent
Diab et al.

(10) Patent No.: US 8,543,858 B2
(45) Date of Patent: Sep. 24, 2013

(54) SYSTEM AND METHOD FOR MANAGING NETWORK DEVICES THAT DELIVER AN APPLICATION SERVICE USING ENERGY SAVINGS INFORMATION

(75) Inventors: Wael William Diab, San Francisco, CA (US); David Berry, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 202 days.

(21) Appl. No.: 12/854,938

(22) Filed: Aug. 12, 2010

(65) Prior Publication Data

US 2011/0252257 A1     Oct. 13, 2011

Related U.S. Application Data

(60) Provisional application No. 61/321,778, filed on Apr. 7, 2010.

(51) Int. Cl.
*G06F 1/00* (2006.01)
*G06F 1/32* (2006.01)

(52) U.S. Cl.
CPC ................................. *G06F 1/3203* (2013.01)
USPC .......................................... 713/324; 713/323

(58) Field of Classification Search
USPC ................................................ 713/300–340
See application file for complete search history.

(56) References Cited

U.S. PATENT DOCUMENTS

| | | | | |
|---|---|---|---|---|
| 7,237,129 | B2 * | 6/2007 | Fung | 713/323 |
| 7,574,505 | B2 * | 8/2009 | Park et al. | 709/224 |
| 8,145,920 | B2 * | 3/2012 | Tsai et al. | 713/300 |
| 2007/0101173 | A1 * | 5/2007 | Fung | 713/300 |
| 2009/0077394 | A1 | 3/2009 | Tsai et al. | |
| 2009/0077398 | A1 * | 3/2009 | Bland et al. | 713/320 |
| 2009/0106571 | A1 * | 4/2009 | Low et al. | 713/310 |
| 2009/0144568 | A1 * | 6/2009 | Fung | 713/300 |
| 2009/0265568 | A1 * | 10/2009 | Jackson | 713/320 |
| 2010/0180275 | A1 * | 7/2010 | Neogi et al. | 718/1 |
| 2010/0217944 | A1 * | 8/2010 | DeHaan et al. | 711/156 |
| 2011/0016342 | A1 * | 1/2011 | Rowan et al. | 713/340 |
| 2011/0035498 | A1 * | 2/2011 | Shah et al. | 709/226 |
| 2011/0040990 | A1 * | 2/2011 | Chan et al. | 713/300 |
| 2011/0055605 | A1 * | 3/2011 | Jackson | 713/320 |
| 2011/0072293 | A1 * | 3/2011 | Mazzaferri et al. | 713/340 |
| 2011/0161695 | A1 * | 6/2011 | Okita et al. | 713/310 |
| 2012/0005344 | A1 * | 1/2012 | Kolin et al. | 709/226 |
| 2012/0036377 | A1 * | 2/2012 | Tolentino | 713/310 |

FOREIGN PATENT DOCUMENTS

EP    2282446 A1    2/2011

OTHER PUBLICATIONS

EP Search Report.
Blanquicet et al., Managing Energy Use in a Network with a New SNMP Power State MIB, IEEE Conference on Local Computer Networks, Oct. 2008.

* cited by examiner

*Primary Examiner* — Raymond Phan
(74) *Attorney, Agent, or Firm* — Duane S. Kobayashi

(57) ABSTRACT

A system and method for energy efficient Ethernet (EEE) enhanced information technology power management tools. EEE-based computing center resources are designed to monitor energy savings events hardware components (e.g., physical layer device) included within the computing center resource. Energy saving statistics based on such monitoring can be provided to a power management tool. This monitoring information enables the power management tool to make broad service-level energy savings decisions on actual network activity. In addition, feedback based on the broad service-level energy savings decisions can be provided to the EEE-based computing center resources for consideration by their individual EEE control policies.

20 Claims, 5 Drawing Sheets

SYSTEM AND METHOD FOR MANAGING NETWORK DEVICES THAT DELIVER AN APPLICATION SERVICE USING ENERGY SAVINGS INFORMATION

This application claims priority to provisional patent application No. 61/321,778, filed Apr. 7, 2010, which is incorporated by reference herein, in its entirety, for all purposes.

BACKGROUND

1. Field of the Invention

The present invention relates generally to power management and, more particularly, to a system and method for energy efficient Ethernet enhanced information technology power management tools.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced.

Efforts to eliminate excess power usage are particularly valuable to data centers and computing centers, which house large numbers of server systems. One of the ways in which power savings can be obtained is through the switching off of unneeded servers and repurposing servers based on demand. Through these power savings techniques, it is recognized that an ideal matching of computing resources to computing demand will minimize the amount of power consumed. What is needed therefore is a mechanism that provides IT administrators with power management tools that will enable them to make intelligent power saving decisions.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Dynamic power management in the context of a data or computing center is based on an analysis of demand levels. Many conventional solutions can be designed to perform power management based on an inference of demand levels at the data or computing center. These inferences are at best a guess.

In the present invention, inferences of demand levels is replaced with an analysis of power consumption and network demand of computing center resources (e.g., servers, switches, etc.) that can leverage power saving states in one or more hardware subsystems contained within the computing center resource. This analysis provides a more accurate measure of the actual use of computing services provided by the data or computing center. One example of such an analysis is that provided by energy efficient Ethernet (EEE) networks.

In general, EEE networks attempt to save power when the traffic utilization of the network is not at its maximum capacity. This serves to minimize the performance impact while maximizing energy savings. At a broad level, the EEE control policy for a particular link in the network determines when to enter an energy saving state, what energy saving state (i.e., level of energy savings) to enter, how long to remain in that energy saving state, what energy saving state to transition to out of the previous energy saving state, etc. EEE control policies can base these decisions on a combination of static settings established by an IT manager and the properties of the traffic on the link itself.

Figure 1:
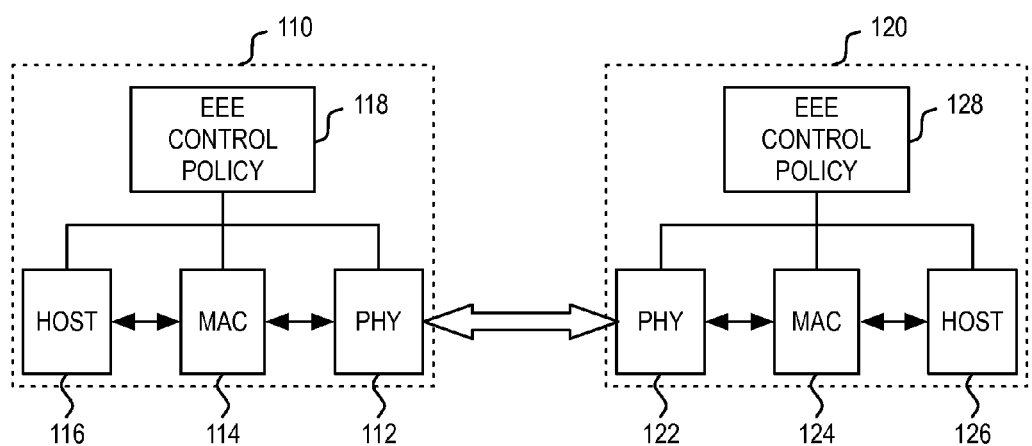
FIG. 1 illustrates an Ethernet link between a local and remote link partner.

FIG. 1 illustrates an example link to which an EEE control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As would be appreciated, the link can operate at standard or non-standard (e.g., 2.5G, 5G, 10G, etc.) link rates, as well as future link rates (e.g., 40G, 100G, etc.). The link can also be supported by various port types (e.g., backplane, twisted pair, optical, etc.) and in various applications (e.g., Broadreach Ethernet, EPON, etc.). As illustrated, link partner 110 includes physical layer device (PHY) 112, media access control (MAC) 114, and host 116, while link partner 120 includes PHY 122, MAC 124, and host 126.

Figure 2:
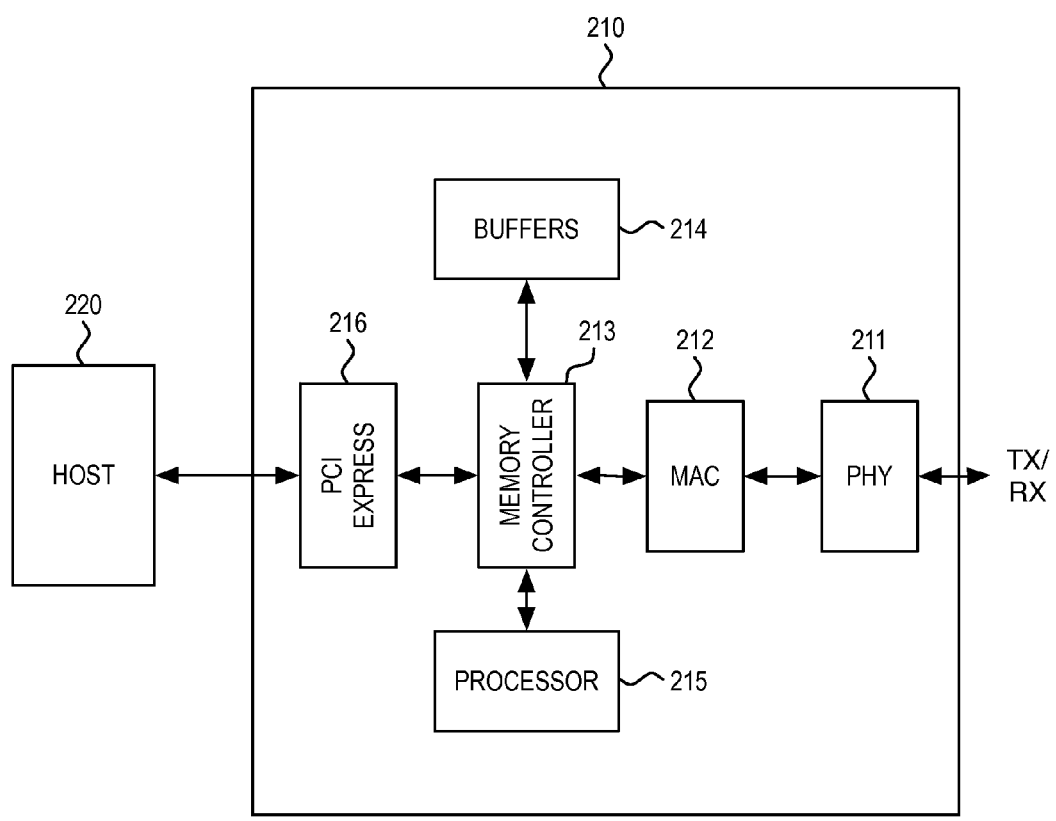
FIG. 2 illustrates an example of a controller.

FIG. 2 illustrates an example of a controller system that can be part of a server (e.g., audio-video (AV) server, high performance computing (HPC) server) in a data or computing center. As illustrated, host system 220 is coupled to integrated Ethernet controller 210. Ethernet controller 210 further includes PHY 211, which is coupled to MAC 212. In the illustrated example, MAC 212 is coupled to PCI Express device 216 via memory controller 213, which is also coupled to buffers 214 and processor 215.

Figure 3:
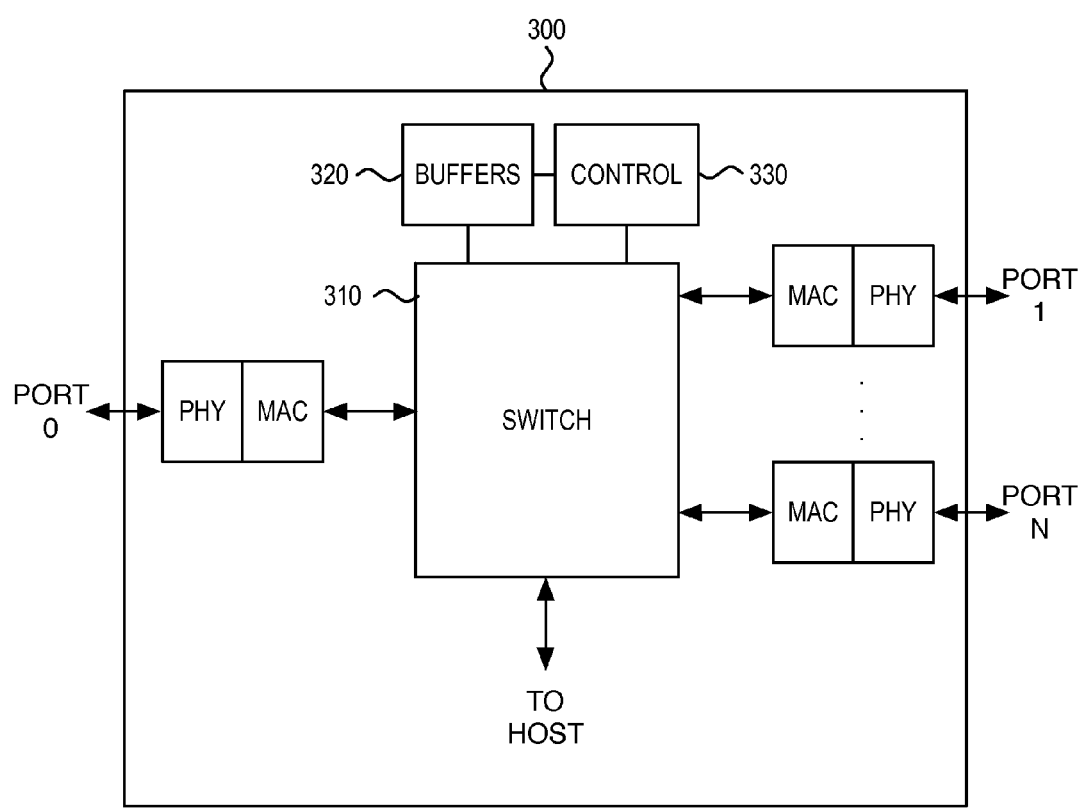
FIG. 3 illustrates an example of a switch.

FIG. 3 illustrates an example switching system 300 that can represent a router or any other device that incorporates multi-port switch functionality. As illustrated, switching system 300 includes switch 310 that supports an internal port and a plurality of external ports 0-N via MAC and PHY interfaces. Switch 310 is also supported by buffers 320 and control 330.

Referring again to FIG. 1, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

During transmission, each layer may add its own header to the data passed on from the interfacing layer above it. During reception, a compatible device having a similar OSI stack may strip off the headers as the message passes from the lower layers up to the higher layers.

In general, controlling the data rate of the link may enable link partners 110 and 120 to communicate in a more energy efficient manner. More specifically, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate.

Another example of subrating is through the use of a low power idle (LPI) technique. In general, LPI relies on turning the active channel silent when there is nothing to transmit. Energy is thereby saved when the link is off. Refresh signals can be sent periodically to enable wake up from the sleep mode.

In general, both the subset and LPI techniques involve turning off or otherwise modifying portions of the PHY during a period of low link utilization. As in the PHY, power savings in the higher layers (e.g., MAC, controller subsystem, switch subsystem, etc.) can also be achieved by using various forms of subrating as well.

As FIG. 1 further illustrates, link partners 110 and 120 also include EEE control policy entities 118 and 128, respectively. In general, EEE control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

In general, EEE control policy entities 118 and 128 can comprise suitable logic, circuitry, and/or code that may be enabled to establish and/or implement an EEE control policy for the network in which the link resides. In various embodiments, EEE control policy entities 118 and 128 can be a logical and/or functional block which may, for example, be implemented in one or more layers, including portions of the PHY, MAC, switch, controller, or other subsystems in the host.

EEE control policy entities 118 and 128 can be enabled to analyze traffic on the physical link and to analyze operations and/or processing of data in link partners 110 and 120. In this manner, EEE control policy entities 118 and 128 may exchange information from, or pertaining to, one or more layers of the OSI hierarchy in order to establish and/or implement the EEE control policy.

As noted, EEE control policies can be designed to base their decisions on a combination of static settings established by an IT manager (e.g., time of day considerations) and the properties of the traffic bandwidth on the link itself. For example, the EEE control policy can be designed to examine empty or non-empty conditions of ports, queues, buffers, etc. to determine whether to transition to or from an power saving state.

EEE control policies can also be designed to base their decisions on dynamic considerations (e.g., type of traffic, identity of the user/device that originated it, etc.). Regardless of the specific nature of the EEE control policy implemented, the result of such an EEE control policy are decisions regarding whether or not to enter an energy saving state, what energy saving state (i.e., level of energy savings) to enter, duration of energy saving state, etc.

Figure 4:
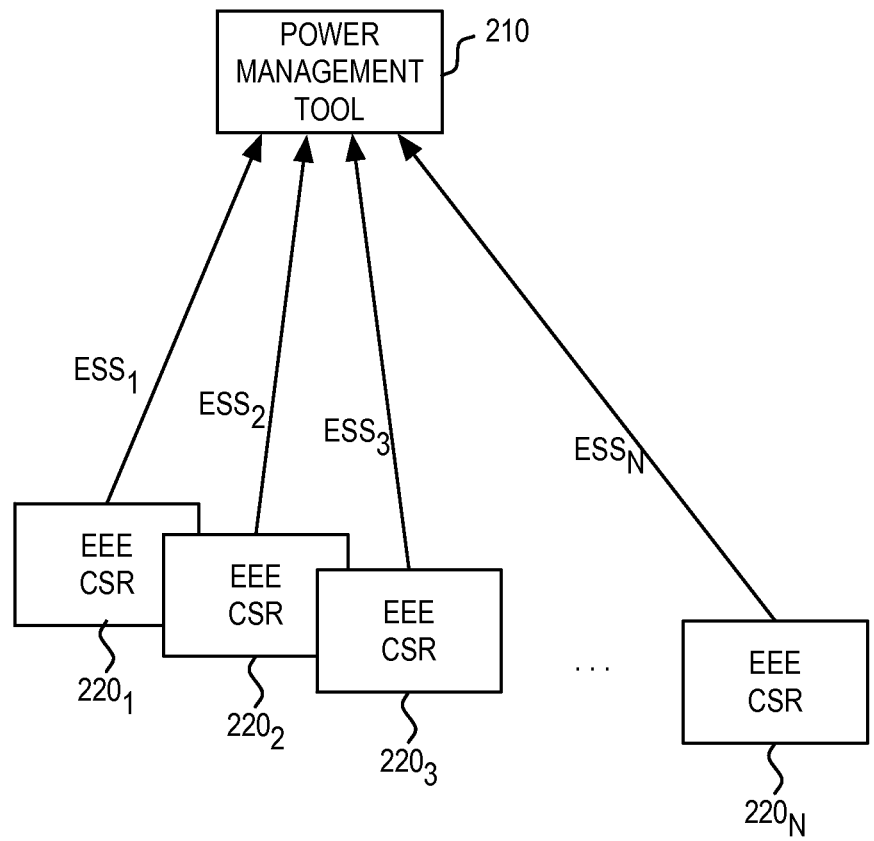
FIG. 4 illustrates an example of a power management tool.

It is a feature of the present invention that information from EEE-capable computing center resources can be used to provide an actual not inferred picture of network demand levels within a data or computing center. More specifically, the link-level analysis produced by the EEE-capable computing center resources provides an actual measure of the utility of various resources in the data or computing center. This measure can further be used to infer the level of demand for various services provided by the data or computing center. This functionality is illustrated by the high-level diagram of FIG. 4, which illustrates a plurality of EEE-capable computing center resources $220_1$-$220_N$ in communication with power management tool 210.

In one example, EEE-capable computing center resources $220_1$-$220_N$ can be designed to forward energy saving statistics to power management tool 210. In one embodiment, the power management tool 210 is a power management application run on a management station. In one example, the forwarded energy saving statistics can include energy saving event data that is captured for a plurality of energy saving events that occurred in a particular measurement interval (e.g., N hours). The provision of these energy saving statistics to power management tool 210 would enable an IT administrator to track the actual utilization of computing center resources as indicated by the energy saving statistics. For example, as certain EEE-capable computing center resources begin to enter energy savings states due to low link utilization, power management tool 210 can discern that demand for application services rendered by those EEE-capable computing center resources has dropped. Further energy savings initiatives such as switching off the server or repurposing the server can then be considered by the IT administrator.

Figure 5:
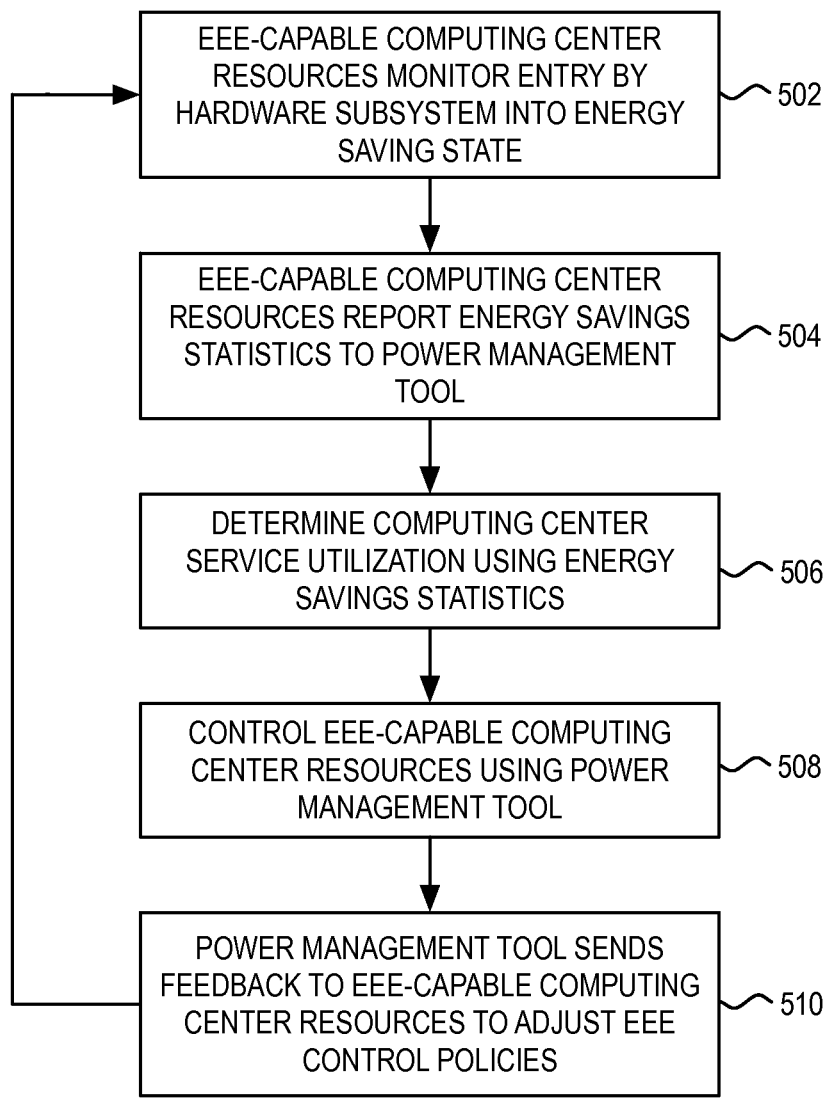
FIG. 5 illustrates a flowchart of a process of the present invention.

To further illustrate the features of the present invention, reference is now made to the flowchart of FIG. 5. As illustrated, the process begins at step 502 where EEE-capable computing center resources monitor entry by one or more hardware subsystems into an energy saving state. In one example, the hardware subsystem can represent the PHY, which can be designed to enter an energy saving state using some form of subrating (e.g., subset PHY, LPI, etc.). As would be appreciated, EEE-capable computing center resources can be designed to monitor energy savings at various hardware levels (e.g., port, chip, board, system, rack, etc.).

Next, at step 504, energy saving statistics based on the monitored event data is reported by the EEE-capable computing center resources to the power management tool. As would be appreciated, the specific type and form of the energy savings statistics that would be reported to the power management tool would be implementation dependent. For example, the frequency of reporting by the EEE-capable computing center resources can be determined based on the needs of the IT administrator. In one embodiment, SNMP can be used to facilitate communication to/from the power management tool and the EEE-capable computing center resources.

Having received energy savings statistics from a plurality of EEE-capable computing center resources, the power management tool can then determine, at step 506, a level of utilization of various services delivered by the data or computing center. In one example, the power management tool can determine a level of utilization of a particular service based on the percentage of time that one or more EEE-capable computing center resources have entered into an energy saving state. This level of utilization statistic would provide a direct indication of the relative lack of utilization of the computer center service provided by one or more computing center resources. As would be appreciated, the reported energy saving statistics can used in various ways to identify the utilization of services based on the relative activity or non-activity of particular computing center resources.

As has been described, the power management tool can generate a utilization analysis of the various services delivered by the computing center based on the energy savings statistics provided by the various EEE-capable computing center resources. In general, the power management tool can be designed to generate an indication of actual computing center service utilization based on a collection of energy savings statistics that are indicative of network traffic. The generated utilization analysis based on such energy savings statistics, enables the power management tool to effect a control of EEE-capable computing center resources at step 508. For example, servers can be switched off or repurposed as indicated by the service utilization analysis.

Finally, at step 510, the service utilization analysis generated by the power management tool can also be fed back to the individual EEE-capable computing center resources for adjustment of their own EEE control policies. In effect, this feedback from the power management tool would enable the individual EEE-capable computing center resources to adjust their energy saving decisions in consideration of the broader service-level policy decisions made using the power management tool. As such, an individual EEE-capable computing center resource can effect an EEE control policy based on broader initiatives beyond the energy savings perspective of the individual EEE-capable computing center resource.

As has been described, the present invention enables more efficient energy decisions from the low-level hardware perspective as well as the high-level service perspective. The high-level service energy savings initiatives are made in consideration of actual activity in the network, while the low-level hardware energy savings initiatives can in turn be adjusted based on broader initiatives undertaken outside of an individual EEE-capable computing center resource.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a data center, said data center including a plurality of server devices, said plurality of server devices being used to provide an application service by said data center, comprising:

receiving, by a network management station in said data center from a first of said plurality of server devices, first energy savings information for a first physical layer device in said first of said plurality of server devices, said first physical layer device being coupled to a first media access control device in said first of said plurality of server devices, said first physical layer device also being coupled to a second physical layer device in a first link partner device via a first network cable, said first energy savings information being generated by said first of said plurality of server devices based upon use by said first physical layer device of an energy savings state in response to a low traffic utilization condition detected by said first of said plurality of server devices;

receiving, by said network management station from a second of said plurality of server devices, second energy savings information for a third physical layer device in said second of said plurality of server devices, said third physical layer device being coupled to a second media access control device in said second of said plurality of server devices, said third physical layer device also being coupled to a fourth physical layer device in a second link partner device via a second network cable, said second energy savings information being generated by said second of said plurality of server devices based upon use by said third physical layer device of an energy savings state in response to a low traffic utilization condition detected by said second of said plurality of server devices;

determining, by said network management station, a level of utilization of said application services delivered by said data center based on said first and second received energy savings information from said first of said plurality of server devices and said second of said plurality of server devices; and switching off one of said plurality of server devices used to deliver said application service based on said determination.

2. The method of claim 1, wherein said receiving comprises receiving statistics of entry by said first physical layer device into an energy savings state.

3. The method of claim 1, wherein said switching comprises switching off one of said first of said plurality of server devices and said second of said plurality of server device.

4. The method of claim 1, wherein said determining is performed by a power management application run on said network management station.

5. A method in a data center, said data center including a plurality of server devices, said plurality of server devices being used to provide an application service by said data center, comprising:

receiving, by a network management station in said data center from a first of said plurality of server devices, first energy savings information for a first hardware subsystem in said first of said plurality of server devices, said first energy savings information being generated by said first of said plurality of server devices based upon use by said first hardware subsystem of an energy savings state in response to a low traffic utilization condition detected by said first of said plurality of server devices in monitoring an absence of traffic that is to be transmitted by a first physical layer device in said first of said plurality of server devices to a second physical layer device in a first link partner device, said first physical layer device and said second physical layer device being coupled by a network cable;

receiving, by said network management station from a second of said plurality of server devices, second energy savings information for a second hardware subsystem in said second of said plurality of server devices, said second energy savings information being generated by said second of said plurality of server devices based upon use by said second hardware subsystem of an energy savings state in response to a low traffic utilization condition detected by said second of said plurality of server devices in monitoring an absence of traffic that is to be transmitted by a third physical layer device in said second of said plurality of server devices to a fourth physical layer device in a second link partner device, said third physical layer device and said fourth physical layer device being coupled by a network cable;

determining, by said network management station, a level of utilization of said application service delivered by said data center based on said first and second received energy savings information from said first of said plurality of server devices and said second of said plurality of server devices; and switching off one of said plurality of server devices used to deliver said application service based on said determination.

6. The method of claim 5, wherein said energy savings information is network port information.

7. The method of claim 5, wherein said energy savings information is chip information.

8. The method of claim 5, wherein said energy savings information is circuit board information.

9. The method of claim 5, wherein said energy savings information is server system information.

10. The method of claim 5, wherein said energy savings information is server rack information.

11. The method of claim 5, wherein said receiving comprises receiving statistics of entry into an energy savings state.

12. The method of claim 5, wherein said switching comprises switching off one of said first of said plurality of server devices and said second of said plurality of server devices.

13. A method for managing an energy efficient control policy in a plurality of server devices in a data center, said plurality of server devices being used to provide an application service by said data center, comprising:

receiving, by a network management station in said data center from a first of said plurality of server devices, first energy savings information for a first hardware subsystem in said first of said plurality of server devices, said first energy savings information being generated by said first of said plurality of server devices based upon use by said first hardware subsystem of an energy savings state in response to a low traffic utilization condition detected by said first of said plurality of server devices in monitoring an absence of traffic that is to be transmitted by a first physical layer device in said first of said plurality of server devices to a second physical layer device in a first link partner device, said first physical layer device and said second physical layer device being coupled by a network cable;

receiving, by said network management station from a second of said plurality of server devices, second energy savings information for a second hardware subsystem in said second of said plurality of server devices, said second energy savings information being generated by said second of said plurality of server devices based upon use by said second hardware subsystem of an energy savings state in response to a low traffic utilization condition detected by said second of said plurality of server devices in monitoring an absence of traffic that is to be transmitted by a third physical layer device in said second of said plurality of server devices to a fourth physical layer device in a second link partner device, said third physical layer device and said fourth physical layer device being couple by a network cable;

determining, by said network management station using said first and second energy savings information, a level of utilization of said application service; and modifying an energy efficient control policy in said first of said plurality of server devices based on said determination, wherein said energy efficient control policy controls an entry by said first hardware subsystem into said energy saving state.

14. The method of claim 13, wherein said receiving comprises receiving power saving statistics, said power saving statistics including an amount of time a hardware subsystem remained in an energy savings state during a measurement interval.

15. The method of claim 13, wherein said modifying comprises changing a level of aggressiveness of said energy efficient control policy in said first of said plurality of server devices.

16. The method of claim 13, wherein said energy savings information is network port information.

17. The method of claim 13, wherein said energy savings information is chip information.

18. The method of claim 13, wherein said energy savings information is circuit board information.

19. The method of claim 13, wherein said energy savings information is server system information.

20. The method of claim 13, wherein said energy savings information is server rack information.

* * * * *